United States Patent
Najima

(10) Patent No.: US 9,707,825 B2
(45) Date of Patent: Jul. 18, 2017

(54) CONTROLLER AND IN-VEHICLE MOTOR-DRIVEN COMPRESSOR

(71) Applicant: KABUSHIKI KAISHA TOYOTA JIDOSHOKKI, Kariya-shi, Aichi-ken (JP)

(72) Inventor: Kazuki Najima, Kariya (JP)

(73) Assignee: KABUSHIKI KAISHA TOYOTA JIDOSHOKKI, Aichi-ken (JP)

(*) Notice: Subject to any disclaimer, the term of this patent is extended or adjusted under 35 U.S.C. 154(b) by 0 days.

(21) Appl. No.: 15/069,079

(22) Filed: Mar. 14, 2016

(65) Prior Publication Data
US 2016/0285396 A1    Sep. 29, 2016

(30) Foreign Application Priority Data

Mar. 26, 2015  (JP) .................................. 2015-064777

(51) Int. Cl.
| H02P 7/00 | (2016.01) |
| B60H 1/32 | (2006.01) |
| H02P 6/185 | (2016.01) |

(52) U.S. Cl.
CPC ......... *B60H 1/3226* (2013.01); *B60H 1/3222* (2013.01); *H02P 6/185* (2013.01)

(58) Field of Classification Search
CPC ....... H02P 6/183; H02P 6/185; B60H 1/3222; B60H 1/3226
USPC .......................................................... 318/433
See application file for complete search history.

(56) References Cited

U.S. PATENT DOCUMENTS

| 5,206,575 | A * | 4/1993 | Nakamura ............. H02P 27/08 318/807 |
| 2003/0210010 | A1* | 11/2003 | Akiwa ................... H02K 1/187 318/685 |
| 2004/0004455 | A1* | 1/2004 | Fujimoto ................. H02P 6/20 318/474 |
| 2009/0034306 | A1* | 2/2009 | Inaba ..................... B60L 11/18 363/131 |
| 2010/0060211 | A1* | 3/2010 | Hashimoto ............ H02P 21/22 318/400.02 |
| 2010/0126234 | A1* | 5/2010 | Maekawa ............. D06F 37/206 68/28 |
| 2012/0187878 | A1* | 7/2012 | Fukasaku ............. G01R 33/007 318/400.21 |
| 2013/0272899 | A1* | 10/2013 | Takahata ................ H02P 6/182 417/44.11 |

FOREIGN PATENT DOCUMENTS

| JP | 2007-318824 A | 12/2007 |
| JP | 4680280 A | 5/2011 |

* cited by examiner

*Primary Examiner* — Bentsu Ro
*Assistant Examiner* — Gabriel Agared
(74) *Attorney, Agent, or Firm* — Sughrue Mion, PLLC

(57) ABSTRACT

The controller controls an inverter that drives an in-vehicle three-phase motor. The controller includes a voltage application unit, a current obtaining unit, an addition unit, an addition conversion unit, and a derivation unit. The current obtaining unit obtains a positive current and a negative current flowing to each of the three phases. The addition unit adds the positive current and the negative current flowing to each phase. The addition conversion unit performs a three-phase to two-phase conversion on the three addition values. The derivation unit derives a magnetic pole position of the rotor, when the rotor is stopped, based on the conversion result of the addition conversion unit.

6 Claims, 8 Drawing Sheets

|  | Pattern 1 | Pattern 2 | Pattern 3 | Pattern 4 | Pattern 5 | Pattern 6 |
|---|---|---|---|---|---|---|
| Qu1 | ON | OFF | OFF | OFF | ON | ON |
| Qu2 | OFF | ON | ON | ON | OFF | OFF |
| Qv1 | OFF | ON | OFF | ON | OFF | ON |
| Qv2 | ON | OFF | ON | OFF | ON | OFF |
| Qw1 | OFF | OFF | ON | ON | ON | OFF |
| Qw2 | ON | ON | OFF | OFF | OFF | ON |
| Corresponding Current | Ipu (+) | Ipv (+) | Ipw (+) | Ipu (−) | Ipv (−) | Ipw (−) |

CONTROLLER AND IN-VEHICLE MOTOR-DRIVEN COMPRESSOR

BACKGROUND OF THE INVENTION

The present invention relates to an in-vehicle motor-driven compressor and a controller configured to control an inverter that drives an in-vehicle three-phase motor.

A known inverter drives, for example, an in-vehicle three-phase motor included in an in-vehicle motor-driven compressor (e.g, refer to Japanese Laid-Open Patent Publication No. 2007-318824). When activating such an in-vehicle three-phase motor, the magnetic pole position of the rotor, when the rotor is stopped, may need to be obtained.

In one example of a configuration for obtaining the magnetic pole position of the stopped rotor, a position sensor may be set in the motor. However, the use of the position sensor increases the number of components. Additionally, the location where the in-vehicle three-phase motor is installed may impose limitations on the arrangement of the position sensor. In this regard, for example, as described in Japanese Patent No. 4680280, the magnetic saturation of the coils in the in-vehicle three-phase motor may be used to estimate a range that includes the magnetic pole position of the stopped rotor.

To accurately control the in-vehicle three-phase motor, instead of the magnetic pole position range of the stopped rotor, a specific numerical value (angle) of the magnetic pole position of the stopped rotor may need to be obtained. Thus, there is room for improvement in a configuration for obtaining the magnetic pole position of the stopped rotor.

It is an object of the present invention to provide a controller that controls an inverter for driving an in-vehicle three-phase motor and accurately obtains the magnetic pole position of a stopped rotor and an in-vehicle motor-driven compressor that includes the controller.

To achieve the above object, a first aspect of the invention provides a controller configured to control an inverter that drives an in-vehicle three-phase motor. The in-vehicle three-phase motor includes a u-phase coil, a v-phase coil, a w-phase coil, and a rotor incorporating a permanent magnet. The controller includes a voltage application unit, a current obtaining unit, an addition unit, an addition conversion unit, and a derivation unit. The voltage application unit is configured to apply a voltage having a predetermined pulse width to each of the phase coils in a positive direction and a negative direction. The current obtaining unit is configured to obtain a u-phase current in the positive direction, a u-phase current in the negative direction, a v-phase current in the positive direction, a v-phase current in the negative direction, a w-phase current in the positive direction, and a w-phase current in the negative direction that flow when the voltage application unit applies a voltage. The addition unit is configured to calculate a u-phase addition value by adding the u-phase current in the positive direction and the u-phase current in the negative direction, a v-phase addition value by adding the v-phase current in the positive direction and the v-phase current in the negative direction, and a w-phase addition value by adding the w-phase current in the positive direction and the w-phase current in the negative direction. The addition conversion unit is configured to perform a three-phase to two-phase conversion on the three addition values, which are the calculation results of the addition unit. The derivation unit is configured to derive a magnetic pole position of the rotor, when the rotor is stopped, based on the conversion result of the addition conversion unit.

To achieve the above object, a second aspect of the invention provides an in-vehicle three-phase compressor that includes an in-vehicle three-phase motor having a u-phase coil, a v-phase coil, a w-phase coil, and a rotor incorporating a permanent magnet, a compression portion that is driven by the in-vehicle three-phase motor and compresses a fluid, an inverter that drives the in-vehicle three-phase motor, and the controller of the first aspect.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 8A, 8B, 8C, 8D, 8E and 8F are timing charts showing the state of six power switching elements;

FIGS. 8G, 8H and 8I are timing charts showing temporal changes of three phase currents;

DETAILED DESCRIPTION OF THE PREFERRED EMBODIMENTS

One embodiment of a controller and an in-vehicle motor-driven compressor that includes the controller will now be described. The in-vehicle motor-driven compressor of the present embodiment is applied to, for example, a vehicle air conditioner. Thus, in the present embodiment, the fluid compressed by the in-vehicle motor-driven compressor is refrigerant.

Figure 1:
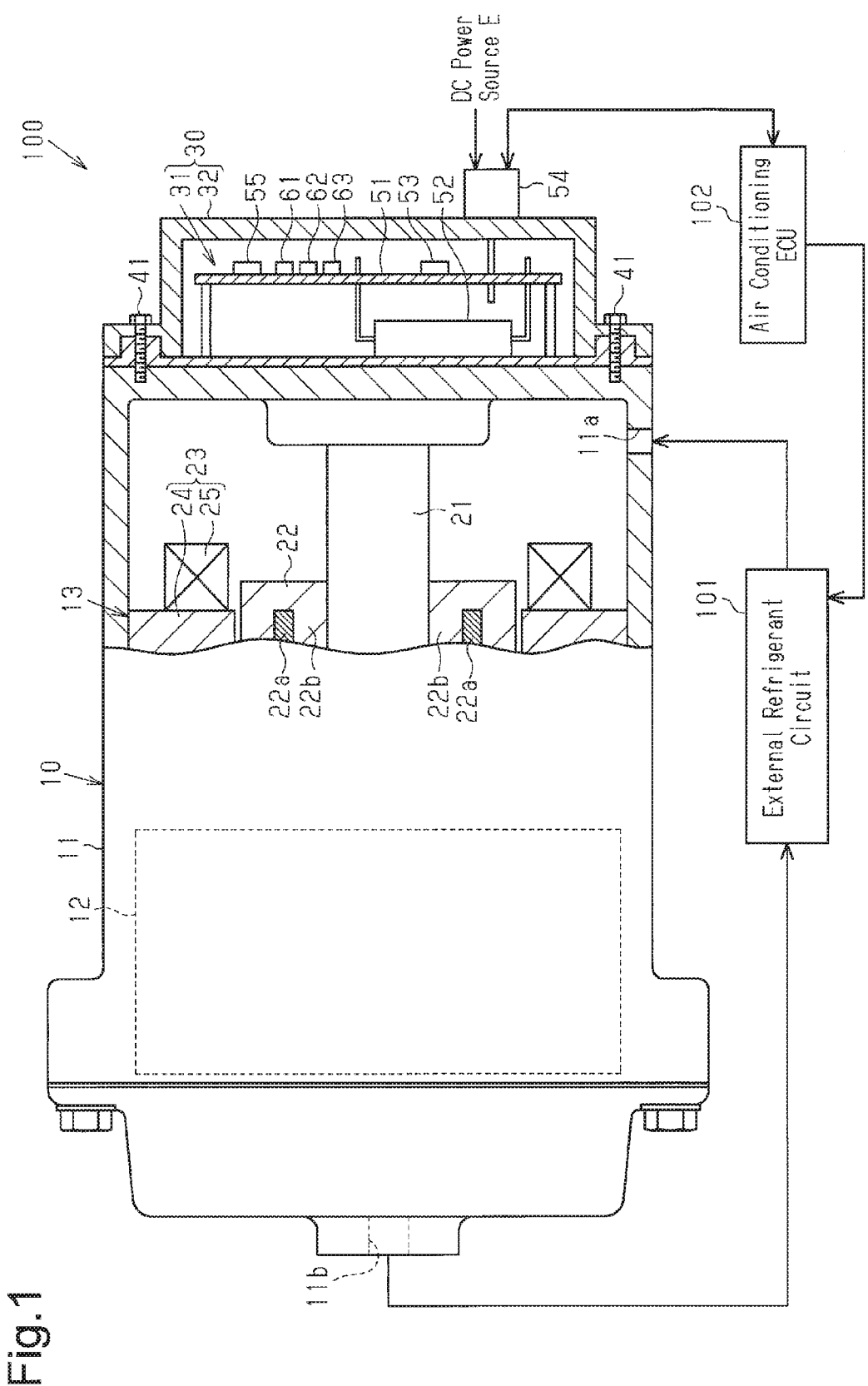
FIG. 1 is a schematic diagram showing a controller, an in-vehicle motor-driven compressor, and a vehicle air conditioner.

As shown in FIG. 1, a vehicle air conditioner 100 includes an in-vehicle motor-driven compressor 10 and an external refrigerant circuit 101, which supplies refrigerant to the in-vehicle motor-driven compressor 10. The external refrigerant circuit 101 includes, for example, a heat exchanger and an expansion valve. The in-vehicle motor-driven compressor 10 compresses refrigerant, and the external refrigerant circuit 101 performs heat exchange of the refrigerant and expands the refrigerant. This allows the vehicle air conditioner 100 to cool or warm the passenger compartment.

The vehicle air conditioner 100 includes an air conditioning ECU 102, which controls the entire vehicle air conditioner 100. The air conditioning ECU 102 is configured to obtain parameters such as the temperature of the passenger compartment and a target temperature. Based on the parameters, the air conditioning ECU 102 outputs various commands such as an ON-OFF command to the in-vehicle motor-driven compressor 10.

The in-vehicle motor-driven compressor 10 includes a housing 11, a compression portion 12, and an in-vehicle three-phase motor 13, which serves as an electric motor. The housing 11 has an inlet 11a, into which refrigerant from the external refrigerant circuit 101 is drawn. The compression portion 12 and the in-vehicle three-phase motor 13 are accommodated in the housing 11.

The housing 11 is substantially cylindrical as a whole. The housing 11 has an outlet 11b through which refrigerant is discharged.

The compression portion 12 compresses refrigerant that has been drawn into the housing 11 through the inlet 11a and discharges the compressed refrigerant through the outlet 11b. The specific structure of the compression portion 12 may be any type such as a scroll type, a piston type, and a vane type.

The in-vehicle three-phase motor 13 drives the compression portion 12. The in-vehicle three-phase motor 13 includes a columnar rotary shaft 21, which is rotationally supported, for example, by the housing 11, a cylindrical rotor 22, which is fixed to the rotary shaft 21, and a stator 23 fixed to the housing 11. The rotor 22 includes a cylindrical rotor core 22b, which includes a plurality of embedded magnets 22a. The magnets 22a are permanent magnets. The axis of the rotary shaft 21 coincides with the axis of the cylindrical housing 11. The stator 23 includes a cylindrical stator core 24 and coils 25 wound about the teeth of the stator core 24. The rotor 22 and the stator 23 face each other in the radial direction of the rotary shaft 21.

As shown in FIG. 1, the in-vehicle motor-driven compressor 10 includes an inverter unit 30, which includes an inverter 31 and a case 32. The inverter 31 serves as a drive circuit that drives the in-vehicle three-phase motor 13, and the case 32 accommodates the inverter 31. The coils 25 of the in-vehicle three-phase motor 13 and the inverter 31 are connected to each other by connectors (not shown). The case 32 is fixed to the housing 11 with bolts 41, which serve as fasteners. That is, the inverter 31 is integrated with the in-vehicle motor-driven compressor 10 of the present embodiment.

The inverter 31 includes, for example, a circuit board 51 and a power module 52, which is electrically connected to the circuit board 51. The circuit board 51 has various electronic components and a wiring pattern. A voltage sensor 53 is mounted on the circuit board 51. The voltage sensor 53 serves as an input voltage detection unit that detects, for example, an input voltage Vd of the inverter 31. A connector 54 is provided on the outer surface of the case 32. The circuit board 51 and the connector 54 are electrically connected to each other. The inverter 31 receives power from a DC power source E via the connector 54. The air conditioning ECU 102 and the inverter 31 are electrically connected to each other.

The DC power source E is a power storage device mounted on the vehicle. The power storage device is any device that is capable of storing power such as a battery or an electric double-layer capacitor. In this case, the input voltage Vd of the inverter 31 changes in accordance with the state of the power storage device, for example, the state of charge (SOC) of the battery.

Figure 2:
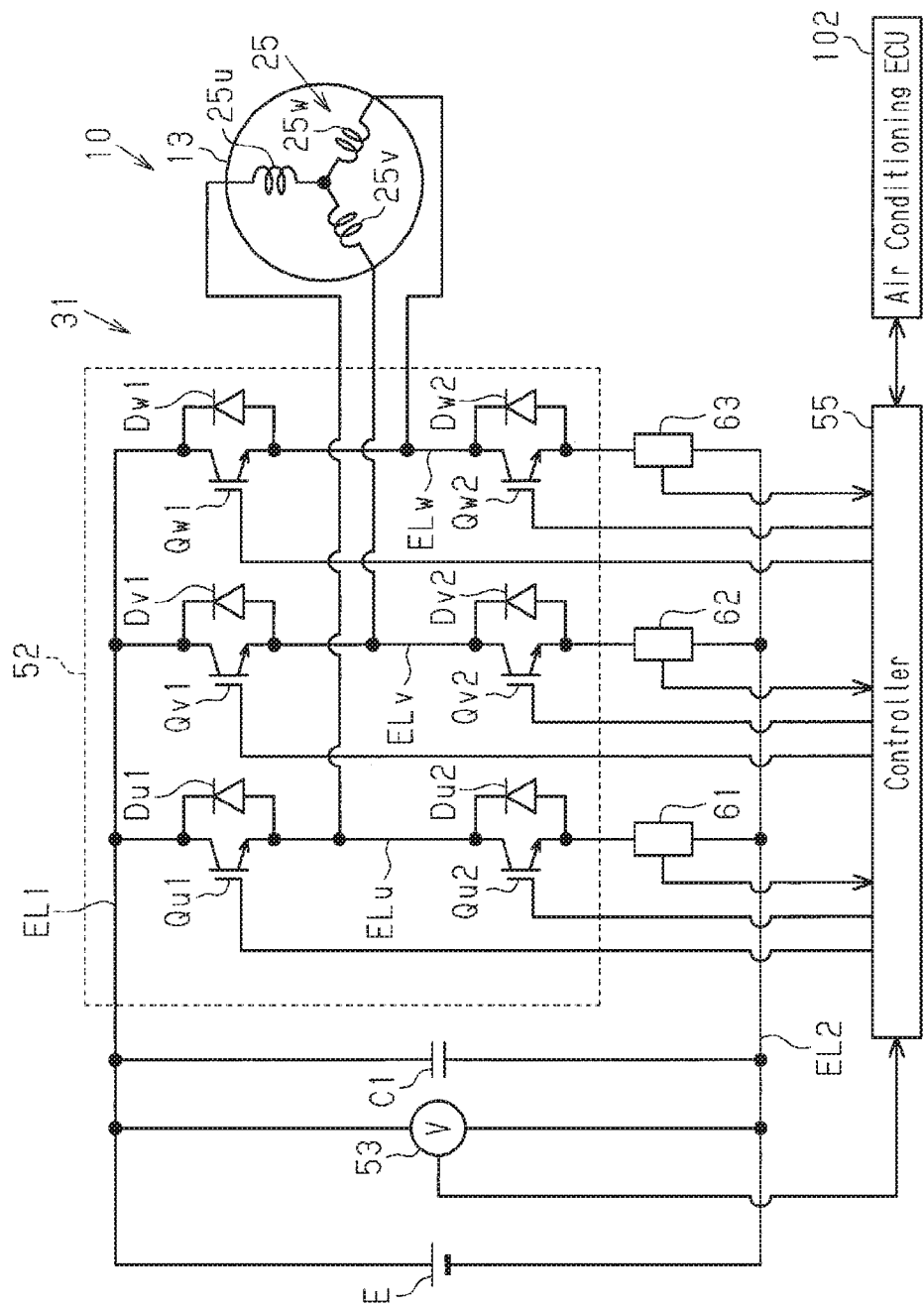
FIG. 2 is a circuit diagram showing the electrical configuration of an inverter and the controller.

As shown in FIG. 2, the coils 25 of the in-vehicle three-phase motor 13 are of a three-phase structure, for example, with a u-phase coil 25u, a v-phase coil 25v, and a w-phase coil 25w. The coils 25u to 25w are connected in a Y-connection.

The power module 52 includes u-phase power switching elements Qu1, Qu2 corresponding to the u-phase coil 25u, v-phase power switching elements Qv1, Qv2 corresponding to the v-phase coil 25v, and w-phase power switching elements Qw1, Qw2 corresponding to the w-phase coil 25w. That is, the inverter 31 is a three-phase inverter.

The switching elements Qu1, Qu2, Qv1, Qv2, Qw1, and Qw2 (hereinafter, simply referred to as the switching elements Qu1 to Qw2) are each constituted, for example, by an insulated gate bipolar transistor (IGBT). Instead, the switching elements Qu1 to Qw2 may each be any switching element such as a power MOSFET.

The inverter 31 includes two power lines EL1, EL2, which are connected to the DC power source E, and a u-phase wiring ELu, which is connected to the power lines EL1, EL2 and includes the u-phase power switching elements Qu1, Qu2. The u-phase power switching elements Qu1, Qu2 are connected in series to each other by the u-phase wiring ELu. The u-phase wiring includes a connected portion of the u-phase power switching elements Qu1, Qu2, which is connected to the u-phase coil 25u.

In the same manner, the inverter 31 includes a v-phase wiring ELv, which is connected to the power lines EL1, EL2 and includes the v-phase power switching elements Qv1, Qv2. The v-phase wiring ELv includes a connection portion of the v-phase power switching elements Qv1, Qv2, which is connected to the v-phase coil 25v. The inverter 31 includes a w-phase wiring ELw, which is connected to the power lines EL1, EL2 and includes the w-phase power switching elements Qw1, Qw2. The w-phase wiring ELw includes a connection portion of the w-phase power switching elements Qw1, Qw2, which is connected to the w-phase coil 25w.

The inverter 31 includes a smoothing capacitor C1, which is connected in parallel with the DC power source E. The power module 52 includes freewheeling diodes Du1 to Dw2, which are respectively connected in parallel with the power switching elements Qu1 to Qw2. The freewheeling diodes Du to Dw2 may be parasitic diodes of the power switching elements Qu1 to Qw2. Alternatively, the freewheeling diodes Du to Dw2 may be arranged separately from the power switching elements Qu1 to Qw2.

The in-vehicle motor-driven compressor 10 includes a controller 55, which controls the inverter 31 (specifically, switching of the power switching elements Qu1 to Qw2). The controller 55, which includes a circuitry such as a microcomputer or a processor, is programmed to execute various processes. The controller 55 is connected to the gates of the power switching elements Qu1 to Qw2. Additionally, the controller 55 is configured to exchange information with the air conditioning ECU 102. When receiving a command (e.g., activation command) from the air conditioning ECU 102, the controller 55 periodically applies a voltage having a predetermined pulse width δT to each of the power switching elements Qu1 to Qw2. Thus, the controller 55 periodically switches ON and OFF the power switching elements Qu1 to Qw2. This converts DC power from the DC power source E into AC power. When receiving the converted AC power, the in-vehicle three-phase motor 13 drives, that is, rotates.

The controller 55 is configured to obtain the input voltage Vd of the inverter 31 and phase currents Iu to Iw, which flow to the coils 25u to 25w, respectively. More specifically, as shown in FIG. 2, the voltage sensor 53 transmits a detection result to the controller 55. The inverter 31 includes current sensors 61 to 63, which serve as current detection units that detect current flowing through the phase wirings ELu to ELw, respectively. The current sensors 61 to 63 are respectively arranged in the phase wirings ELu to ELw between the lower-arm power switching elements Qu2 to Qw2 and the power line EL2. The current sensors 61 to 63 transmit detection results to the controller 55. Based on the detection results of the current sensors 61 to 63, the controller 55 obtains the u-phase current Iu, which flows to the u-phase coil 25u, the v-phase current Iv, which flows to the v-phase coil 25v, and the w-phase current Iw, which flows to the w-phase coil 25w.

If the in-vehicle motor-driven compressor 10, more specifically, the in-vehicle three-phase motor 13, is activated when the rotor 22 is stopped, the controller 55 executes an initial position obtaining process to obtain an initial position θt, which is the magnetic pole position of the stopped rotor 22, without rotating the rotor 22. The initial position θt may also be referred to as the magnetic pole position of the rotor 22 or the position of the d-axis.

The initial position obtaining process uses the salient pole characteristics and magnetic saturation characteristics of the phase coils 25u to 25w. The salient pole characteristics and magnetic saturation characteristics of the phase coils 25u to 25w and the initial position obtaining process will now be described.

The salient pole characteristics of the phase coils 25u to 25w will first be described. The magnets 22a, which are embedded into the rotor core 22b, have a lower magnetic permeability than the rotor core 22b. Thus, the synthetic inductance of the phase coils 25u to 25w is decreased when the u-phase coil 25u is energized so that magnetic flux extends through the magnets 22a compared to when the u-phase coil 25u is energized so that magnetic flux does not extend through the magnets 22a.

Figure 3:
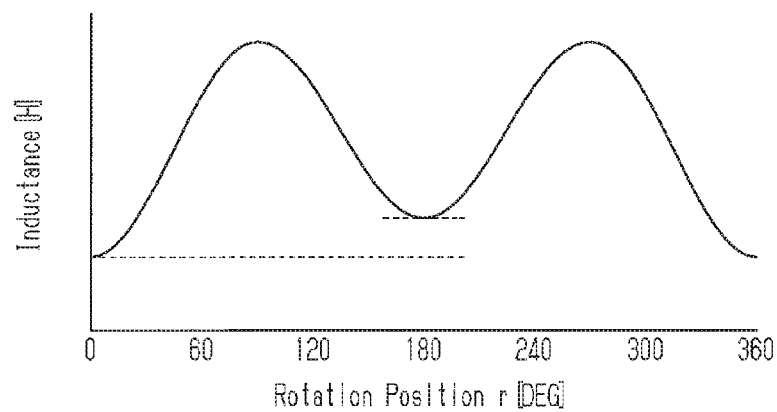
FIG. 3 is a graph showing the inductance characteristics of a u-phase coil when current flows in a positive direction.
Figure 4:
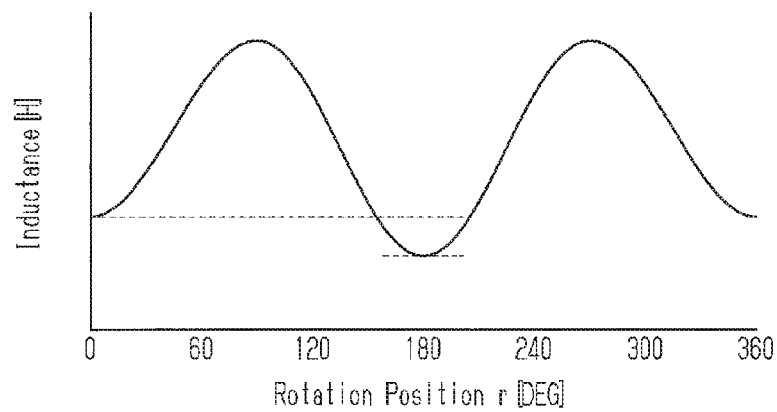
FIG. 4 is a graph showing the inductance characteristics of the u-phase coil when current flows in a negative direction.

The magnetic saturation characteristics of the phase coils 25u to 25w will now be described. The magnetic saturation is formed when the u-phase coil 25u is energized to form magnetic flux extending in the same direction as the magnetic flux formed by the magnets 22a, which are embedded in the rotor 22. This decreases inductance Lu of the u-phase coil 25u. As shown in FIGS. 3 and 4, because of the salient pole characteristics and the magnetic saturation characteristics, the inductance Lu of the u-phase coil 25u varies in accordance with a rotation position r of the rotor 22. More specifically, the inductance Lu substantially has a sine waveform with different amplitudes at negative peaks.

Particularly, as shown in FIGS. 3 and 4, the inductance Lu of the u-phase coil 25u differs between when the rotation position r is zero degrees and when the rotation position r is 180 degrees. More specifically, FIG. 3 shows the inductance Lu when current flows to the u-phase coil 25u in the positive direction. In this case, the inductance Lu of the u-phase coil 25u is lower when the rotation position r is zero degrees than when the rotation position r is 180 degrees.

FIG. 4 shows the inductance Lu when current flows to the u-phase coil 25u in the negative direction, which is opposite to the positive direction. In this case, the direction of the magnetic flux generated by current is inverted relative to when the current flows in the positive direction. Thus, the inductance Lu is lower when the rotation position r is 180 degrees than when the rotation position r is zero degrees.

Figure 5:
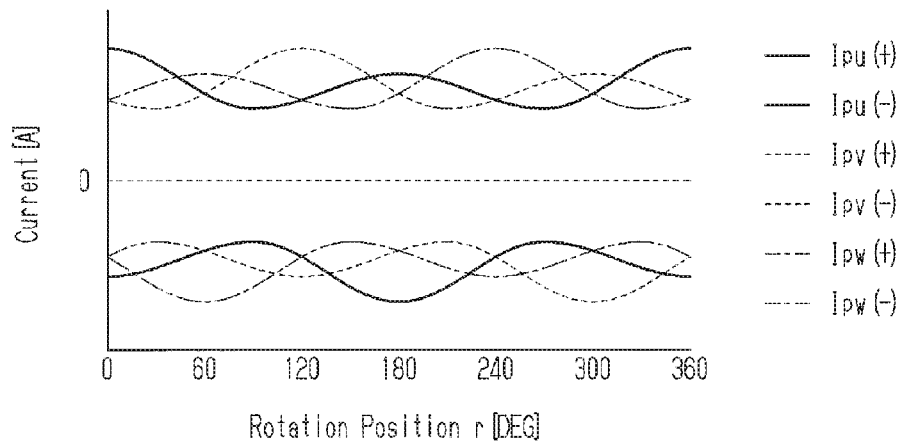
FIG. 5 is a graph showing phase currents when a pulse voltage is applied.

The characteristics of the phase currents Iu to Iw relative to the rotation position r will now be described with reference to FIG. 5. FIG. 5 is a graph showing peak values Ipu(+) to Ipw(+) of the phase currents Iu to Iw when a voltage having the pulse width δT that is set to form the magnetic saturation is applied in the positive direction. The graph also shows peak values Ipu(−) to Ipw(−) of the phase currents Iu to Iw when the voltage having the pulse width δT that is set to form the magnetic saturation is applied in the negative direction.

In the description, hereafter, the peak value Ipu(+) of the u-phase current Iu in the positive direction may be simply referred to as the Ipu(+), and the peak value Ipu(−) of the u-phase current Iu may be simply referred to as the Ipu(−). In the same manner, the peak value Ipv(+) of the v-phase current Iv in the positive direction may be simply referred to as the Ipv(+), and the peak value Ipv(−) of the v-phase current Iv may be simply referred to as the Ipv(−). The peak value Ipw(+) of the w-phase current Iw in the positive direction may be simply referred to as the Ipw(+), and the peak value Ipw(−) of the w-phase current Iw may be simply referred to as the Ipw(−).

As shown in FIG. 5, the peak values Ipu(+), Ipv(+), and Ipw(+) are positive and substantially have sine waveforms with different amplitudes at positive peaks relative to the rotation position r. The phases of the peak values Ipu(+), Ipv(+), and Ipw(+) are shifted from one another by 120 degrees.

The Ipu(−), Ipv(−), and Ipw(−) are negative and substantially have sine waveforms with different amplitudes at negative peaks relative to the rotation position r. The phases of the Ipu(−), Ipv(−), and Ipw(−) are shifted from one another by 120 degrees.

The Ipu(+) and the Ipu(−) are in antiphase. The Ipv(+) and the Ipv(−) are in antiphase. The Ipw(+) and the Ipw(−) are in antiphase. In the description hereafter, the six peaks, namely, the Ipu(+), the Ipu(−), the Ipv(+), the Ipv(−), the Ipw(+), and the Ipw(−), may be simply referred to as the Ipu(+) to Ipw(−).

To simplify the illustration, FIG. 5 does not show errors such as measurement errors, or variations. However, errors occur in a practical case. FIG. 10, FIG. 11, FIG. 13, and FIG. 14, which will be described later, also do not show errors.

The initial position obtaining process will now be described.

Figure 6:
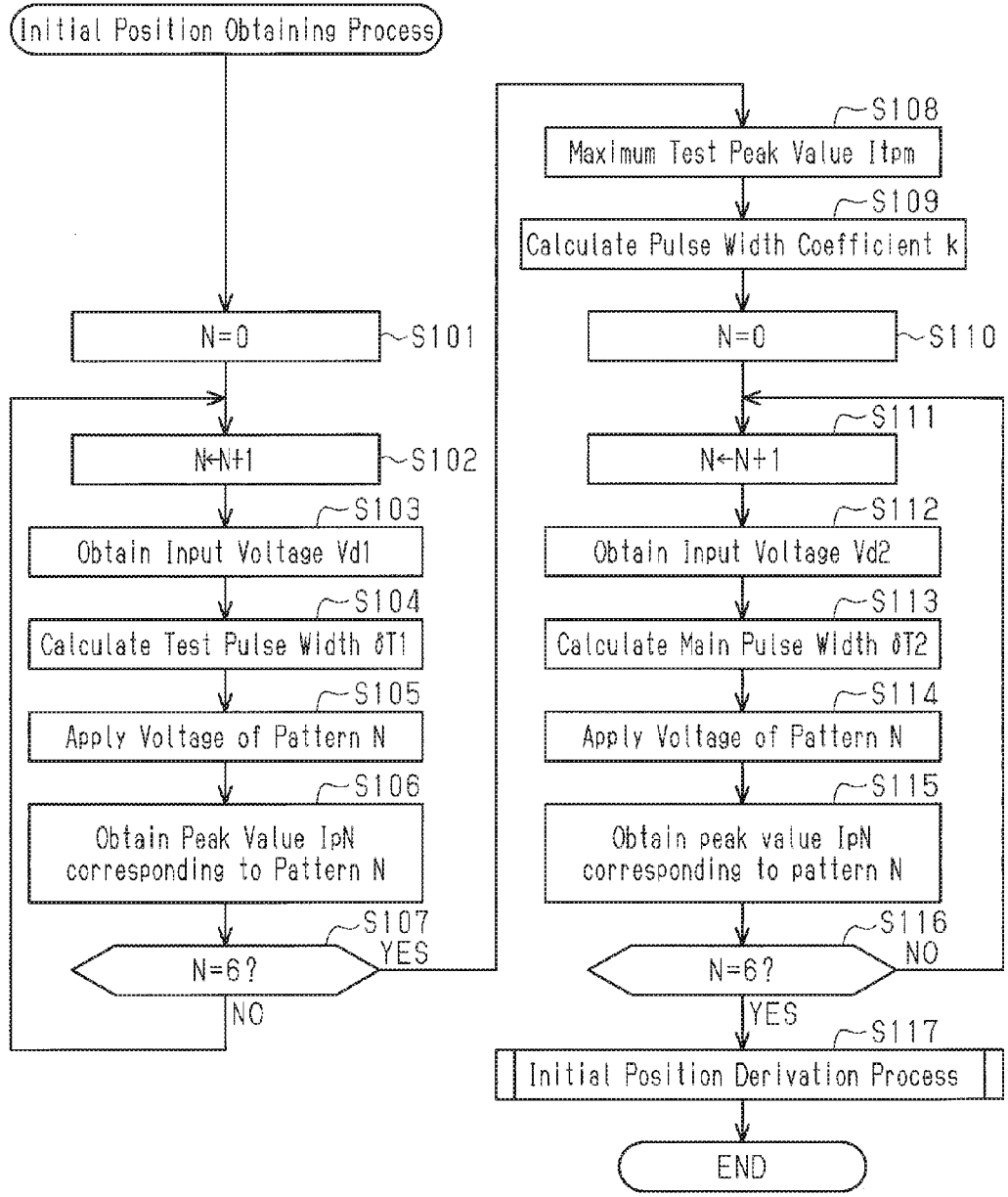
FIG. 6 is a flowchart showing an initial position obtaining process.

As shown in FIG. 6, in step S101, the controller 55 sets a determination number N to "0" as an initial value. The determination number N determines which one of patterns 1 to 6, which are six patterns of voltage applications and will be described later, is to be executed. The determination number N also determines how many times the process of step S102 to step S106 are repeated. In step S102, the controller 55 increments the determination number N by one.

In step S103, the controller 55 obtains the present input voltage Vd1 from a detection result of the voltage sensor 53. In step S104, the controller 55 calculates a test pulse width δT1, which serves as a first pulse width, based on the input voltage Vd1, which is obtained in step S103.

The test pulse width δT1 is the pulse width δT that is set so that the rotor 22 does not rotate regardless of the state of the in-vehicle three-phase motor 13. Here, the u-phase will be described as an example. A value obtained by multiplying the inductance Lu of the u-phase coil 25u and the Ipu(+) is equal to a value obtained by multiplying the input voltage Vd and the pulse width δT (Lu×Ipu(+)=Vd×δT). The inductance Lu of the u-phase coil 25*u* varies depending on conditions such as the rotation position r and the temperature of the u-phase coil 25*u*.

In this configuration, the maximum value of the u-phase current Iu that, for example, allows for magnetic saturation of the u-phase coil 25*u* but does not allow for rotation of the rotor 22 is defined as a maximum allowance current Im. The test pulse width δT1 is set in accordance with the input voltage Vd1 obtained in step S103 so that the absolute values of the Ipu(+) and the Ipu(−) do not exceed the maximum allowance current Im regardless of assumed variations in the inductance Lu of the u-phase coil 25*u*, or shifts in the rotation position r, and assumed variations in the temperature of the u-phase coil 25*u*. In this case, the test pulse width δT1 is inversely proportional to the input voltage Vd1 and set to be narrower as the input voltage Vd1 increases.

The above relationship is not limited to the u-phase and applied to the v-phase and the w-phase. More specifically, the test pulse width δT1 is set in accordance with the input voltage Vd1 so that the maximum value of the absolute values of the peak values Ipu(+) to Ipw(−) obtained when the voltage of the test pulse width δT1 is applied does not exceed the maximum allowance current Im regardless of assumed variations in the inductances Lu to Lw of the phase coils 25*u* to 25*w*.

After calculating the test pulse width δT1 in step S104, in step S105, the controller 55 applies the voltage having a pattern N, which includes the six patterns 1 to 6. The determination number N, which is updated in step S102, is set, or assigned, in "N" of the pattern N. For example, when the determination number N is "1," the controller 55 applies the voltage of the pattern 1.

Figure 7:
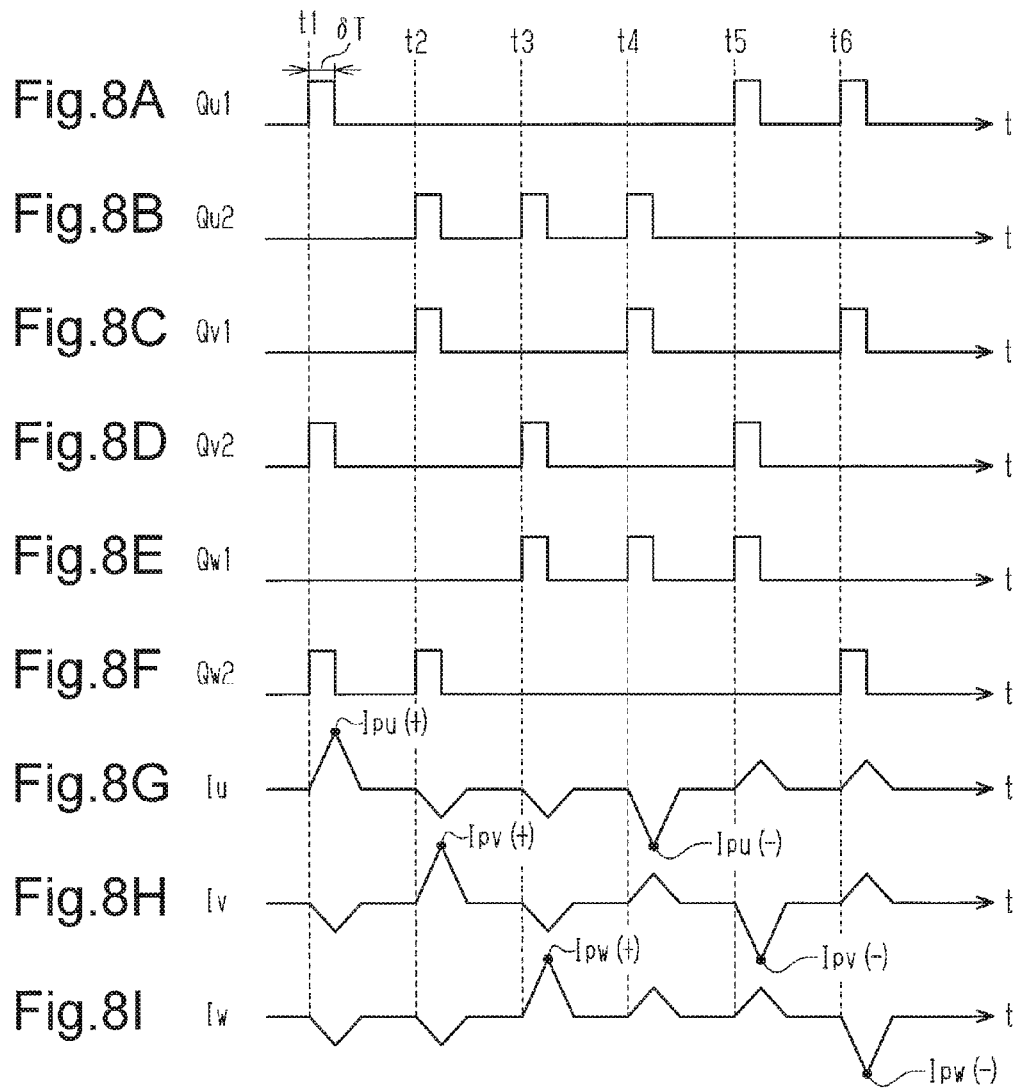
FIG. 7 is a table showing six patterns.

As shown in FIGS. 7 and 8, the controller 55 applies the voltages of the six patterns 1 to 6 to obtain six parameters, namely, Ipu(+) to Ipw(−).

The pattern 1 corresponds to the Ipu(+). In the pattern 1, the first u-phase power switching element Qu1, the second v-phase power switching element Qv2, and the second w-phase power switching element Qw2 are ON, and the second u-phase power switching element Qu2, the first v-phase power switching element Qv1, and the first w-phase power switching element Qw1 are OFF.

The pattern 2 corresponds to the Ipv(+). In the pattern 2, the second u-phase power switching element Qu2, the first v-phase power switching element Qv1, and the second w-phase power switching element Qw2 are ON, and the first u-phase power switching element Qu1, the second v-phase power switching element Qv2, and the first w-phase power switching element Qw1 are OFF.

The pattern 3 corresponds to the Ipw(+). In the pattern 3, the second u-phase power switching element Qu2, the second v-phase power switching element Qv2, and the first w-phase power switching element Qw1 are ON, and the first u-phase power switching element Qu1, the first v-phase power switching element Qv1, and the second w-phase power switching element Qw2 are OFF.

The pattern 4 corresponds to the Ipu(−). In the pattern 4, the second u-phase power switching element Qu2, the first v-phase power switching element Qv1, and the first w-phase power switching element Qw1 are ON, and the first u-phase power switching element Qu1, the second v-phase power switching element Qv2, and the second w-phase power switching element Qw2 are OFF.

The pattern 5 corresponds to the Ipv(−). In the pattern 5, the first u-phase power switching element Qu1, the second v-phase power switching element Qv2, and the first w-phase power switching element Qw1 are ON, and the second u-phase power switching element Qu2, the first v-phase power switching element Qv1, and the second w-phase power switching element Qw2 are OFF.

The pattern 6 corresponds to the Ipw(−). In the pattern 6, the first u-phase power switching element Qu1, the first v-phase power switching element Qv1, and the second w-phase power switching element Qw2 are ON, and the second u-phase power switching element Qu2, the second v-phase power switching element Qv2, and the first w-phase power switching element Qw1 are OFF.

As shown in FIG. 6, after applying the voltage of the pattern N corresponding to the present determination number N in step S105, in step S106, the controller 55 obtains a peak value IpN that is detected when the voltage of the present pattern N is applied. For example, when the voltage of the pattern 2 is applied, the controller 55 obtains the Ipv(+).

In step S107, the controller 55 determines whether or not the determination number N is "6." When the determination number N is not "6," the controller 55 returns to step S102. More specifically, the controller 55 executes the process of step S102 to step S106 six times in total. In this case, the controller 55 updates the determination number N whenever executing step S102 and applies the voltage of the updated pattern N. Consequently, as shown in FIGS. 8A to 8F, the voltages of the patterns 1 to 6 are applied at times t1 to t6. As shown in FIGS. 8G to 8I, the peak values Ipu(+) to Ipw(−) are detected in correspondence with the patterns 1 to 6. More specifically, the voltage of the test pulse width δT1 is applied to each of the phase coils 25*u* to 25*w* in the positive direction and the negative direction to obtain the six peak values Ipu(+) to Ipw(−) corresponding to the test pulse width δT1. In the description, hereafter, the application of the voltage of the test pulse width δT1 in the six patterns 1 to 6 is referred to as the test voltage application. The test voltage application corresponds to a "first voltage application."

As shown in FIG. 6, after executing the process of step S102 to step S106 six times, the controller 55 obtains a test peak value Itpm that is one of the six peak values Ipu(+) to Ipw(−) corresponding to the test pulse width δT1 and having the greatest absolute value.

In step S109, the controller 55 calculates a pulse width coefficient k, which determines a main pulse width δT2, based on the absolute value of the maximum test peak value Itpm. More specifically, the controller 55 calculates the pulse width coefficient k by multiplying the ratio of the test pulse width δT1 calculated in step S104 for the sixth time to the input voltage Vd1 obtained in step S103 for the sixth time and the ratio of the maximum allowance current Im to the absolute value of the maximum test peak value Itpm (k=(δT1/Vd1)×(Im/|Itpm|)).

The controller 55 performs a main voltage application, which applies the voltage of the main pulse width δT2 to each of the phase coils 25*u* to 25*w* in the positive direction and the negative direction. The main voltage application corresponds to a "second voltage application."

More specifically, in step S110, the controller 55 sets the determination number N to "0" as the initial value. In step S111, the controller 55 updates the determination number N by incrementing by one.

In step S112, the controller 55 obtains a present input voltage Vd2 based on the detection result of the voltage sensor 53. In step S113, the controller 55 calculates the main pulse width δT2 corresponding to the input voltage Vd2. The main pulse width δT2 is set in accordance with the input voltage Vd2 so that when applying the voltage having the main pulse width δT2, the maximum value of the absolute values of the six peak values Ipu(+) to Ipw(−) becomes proximate to the maximum allowance current Im within a range that does not exceed the maximum allowance current Im and preferably conforms to the maximum allowance current Im. More specifically, the controller 55 sets the main pulse width δT2 to a value obtained by multiplying the pulse width coefficient k calculated in step S109 and the input voltage Vd2 obtained in step S112 (δT2=k×Vd2).

In step S114, the controller 55 applies the voltage of the pattern N corresponding to the determination number N. In step S115, the controller 55 obtains the peak value IpN corresponding to the pattern N. For example, when the determination number N is "3," the controller 55 applies the voltage of the pattern 3 and obtains the Ipw(+), which corresponds to the pattern 3.

In step S116, the controller 55 determines whether or not the determination number N is "6" and returns to step S111 when the determination number N is not "6." More specifically, the controller 55 executes the process of step S111 to step S115 six times. When the voltage application of the patterns 1 to 6 is performed, the six peak values Ipu(+) to Ipw(−) corresponding to the main pulse width δT2 are obtained.

The controller 55 that executes the process of step S104 and step S113 corresponds to a "pulse width calculation unit." The controller 55 that executes the process of step S105 and step S114 corresponds to a "voltage application unit." The controller 55 that executes the process of step S106 and step S115 corresponds to a "current obtaining unit."

As described above, the main pulse width δT2 is set so that the maximum value of the absolute values of the six peak values Ipu(+) to Ipw(−) becomes proximate to the maximum allowance current Im within a range that does not exceed the maximum allowance current Im. Thus, when the main voltage application is performed, the magnetic saturation is formed without rotating the rotor 22. Thus, the peak values Ipu(+) to Ipw(−) obtained through the main voltage application are affected by the magnetic saturation characteristics.

When the determination number N is "6," that is, when the process of step S111 to step S115 has been executed six times, the controller 55 makes an affirmative determination in step S116. In step S117, the controller 55 executes an initial position derivation process, which derives the initial position θt from the peak values Ipu(+) to Ipw(−) obtained through the main voltage application.

The initial position derivation process will now be described with reference to FIG. 9.

Figure 9:
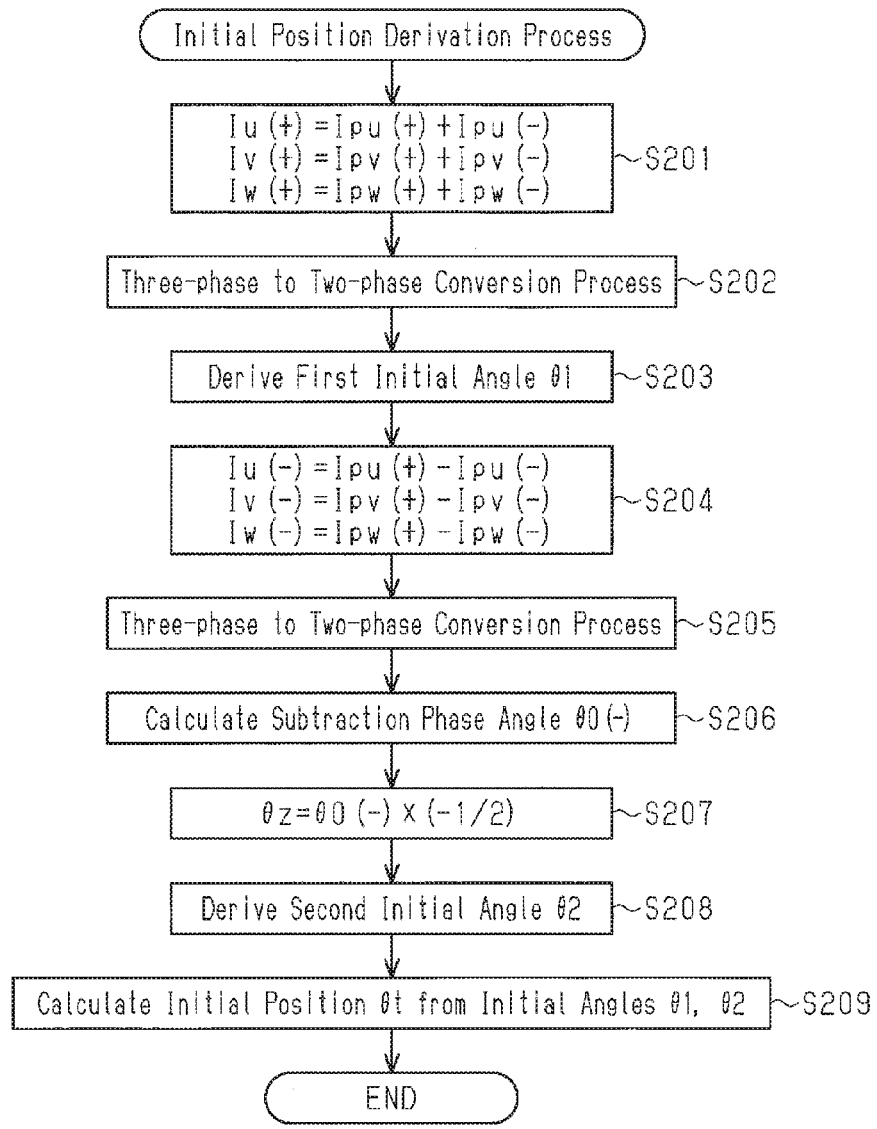
FIG. 9 is a flowchart showing an initial position derivation process.

As shown in FIG. 9, in step S201, the controller 55 adds the positive value and the negative value of the peak values Ipu(+) to Ipw(−) that are obtained through the main voltage application and in the same phase. More specifically, the controller 55 adds the Ipu(+) and the Ipu(−) to obtain a u-phase addition value Iu(+) (Iu(+)=Ipu(+)+Ipu(−)). In the same manner, the controller 55 adds the Ipv(+) and the Ipv(−) to obtain a v-phase addition value Iv(+) (Iv(+)=Ipv(+)+Ipv(−)). The controller 55 adds the Ipw(+) and the Ipw(−) to obtain a w-phase addition value Iw(+) (Iw(+)=Ipw(+)+Ipw(−)). The controller 55 that executes the process of step S201 corresponds to an "addition unit."

Figure 10:
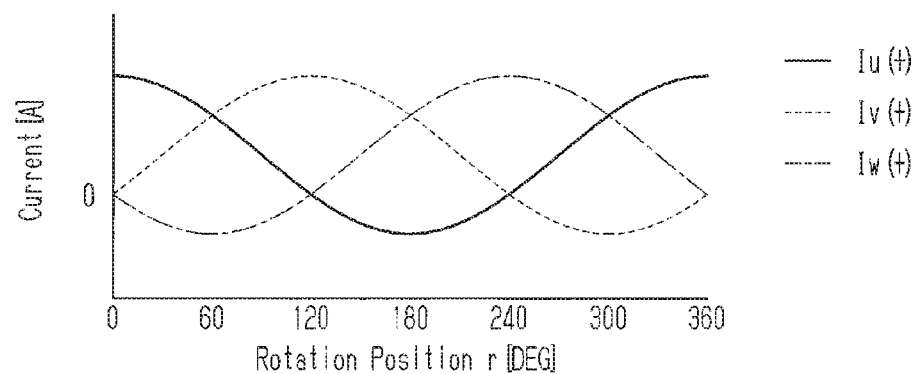
FIG. 10 is a graph showing addition values.

As shown in FIG. 10, each of the addition values Iu(+) to Iw(+) substantially has a sine waveform relative to the rotation position r. The phases of the addition values Iu(+) to Iw(+) are shifted from one another by 120 degrees.

Here, the Ipu(+) to Ipw(+), which are positive values, and the Ipu(−) to Ipw(−), which are negative values, are added. Thus, the absolute values of the addition values Iu(+) to Iw(+) are less than the absolute values of the corresponding the Ipu(+) to Ipw(−). However, the addition values Iu(+) to Iw(+) are angle-dependent because of the magnetic saturation characteristics. That is, the addition values Iu(+) to Iw(+) have current variations that result from the magnetic saturation characteristics relative to the rotation position r. The addition values Iu(+) to Iw(+) may also be referred to as values obtained by subtracting the absolute values of the Ipu(−) to Ipw(−) from the absolute values of the Ipu(+) to Ipw(+), respectively.

The waveforms of the addition values Iu(+) to Iw(+) are substantially sinusoidal and shifted from one another by 120 degrees relative to the rotation position r. Thus, the controller 55 executes the process for deriving a first initial angle θ1 from the addition values Iu(+) to Iw(+).

As shown in FIG. 9, in step S202, the controller 55 executes a three-phase to two-phase conversion process that converts the addition values Iu(+) to Iw(+) from three phases to two phases. More specifically, the controller 55 uses the addition values Iu(+) to Iw(+) to calculate a first conversion value $\alpha$ ($\alpha=\sqrt{(2/3)}\times(Iu(+)-Iv(+)/2-Iw(+)/2)$). The controller 55 also uses the addition values Iu(+) to Iw(+) to calculate a second conversion value $\beta$ ($\beta=\sqrt{(2/3)}\times(\sqrt{3}/2\times Iv(+)-\sqrt{3}/2\times Iw(+))$). The controller 55 that executes the process of step S202 corresponds to an "addition conversion unit."

In step S203, the controller 55 derives the first initial angle θ1. More specifically, the controller 55 calculates an addition phase angle θ0(+), which is a phase of a vector corresponding to the conversion values $\alpha$, $\beta$ obtained through the three-phase to two-phase conversion process in step S202 (θ0(+)=arctan($\alpha/\beta$)). The addition phase angle θ0(+) is a value from −π to π.

The controller 55 converts the addition phase angle θ0(+) to the first initial angle θ1 having a value in a range of 0 to 2π. More specifically, when the addition phase angle θ0(+) has a negative value, the controller 55 sets the first initial angle θ1 to a value obtained by adding 2π to the addition phase angle θ0(+). When the addition phase angle θ0(+) has a positive value, the controller 55 sets the first initial angle θ1 to the addition phase angle θ0(+) without any change.

Figure 11:
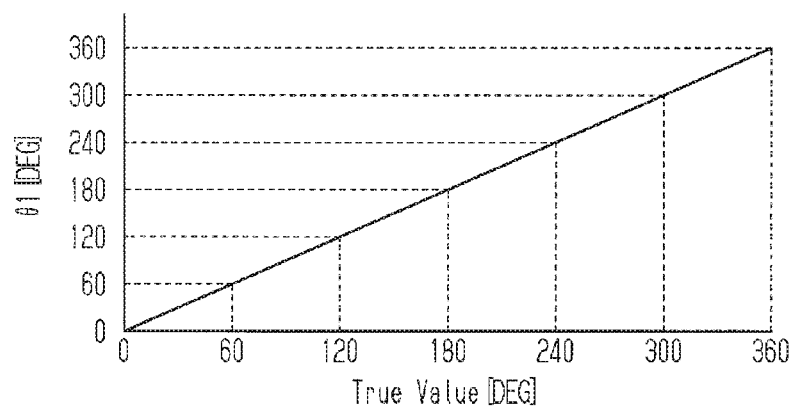
FIG. 11 is a graph showing the calculation result of a first initial angle.
Figure 12:
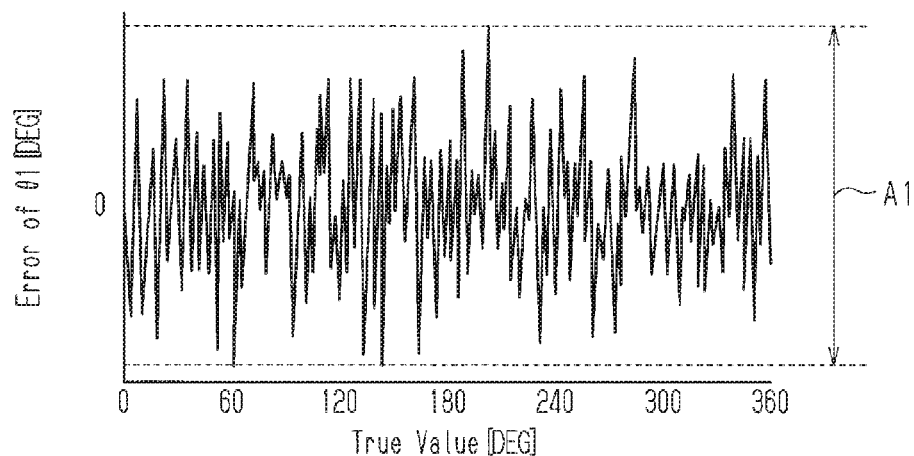
FIG. 12 is a graph showing errors of the first initial angle.

The first initial angle θ1 will now be described with reference to FIGS. 11 and 12. FIG. 11 is a graph showing the calculation result of the first initial angle θ1 relative to the rotation position r (true value of initial position θt). FIG. 12 is a graph showing errors of the first initial angle θ1.

As shown in FIG. 11, the true value of the initial position θt and the first initial angle θ1 have a linear relationship in a range of 0 degrees to 360 degrees. The true value of the initial position θt and the first initial angle θ1 are in one-to-one correspondence. However, the absolute values of the addition values Iu(+) to Iw(+) are practically small. Thus, the calculation of the first initial angle θ1 is easily affected by noise or the like. This easily increases the errors of the first initial angle θ1 as shown in FIG. 12. That is, an error range A1 of the first initial angle θ1 may be easily extended.

In this regard, the controller 55 of the present embodiment derives the initial position θt from the first initial angle θ1 and a second initial angle θ2 that is derived from subtraction values Iu(−) to Iw(−), which are substantially not affected by noise.

As shown in FIG. 9, in step S204, the controller 55 subtracts the negative value from the positive value of the peak values Ipu(+) to Ipw(−) that are obtained through the main voltage application and in the same phase. More specifically, the controller 55 subtracts the Ipu(−) from the Ipu(+) to obtain a u-phase subtraction value Iu(−) (Iu(−)=Ipu(+)−Ipu(−)). In the same manner, the controller 55 subtracts the Ipv(−) from the Ipv(+) to obtain a v-phase subtraction value Iv(−) (Iv(−)=Ipv(+)−Ipv(−)). The controller 55 subtracts the Ipw(−) from the Ipw(+) to obtain a w-phase subtraction value Iw(−) (Iw(−)=Ipw(+)−Ipw(−)). The controller 55 that executes the process of step S204 corresponds to a "subtraction unit."

Figure 13:
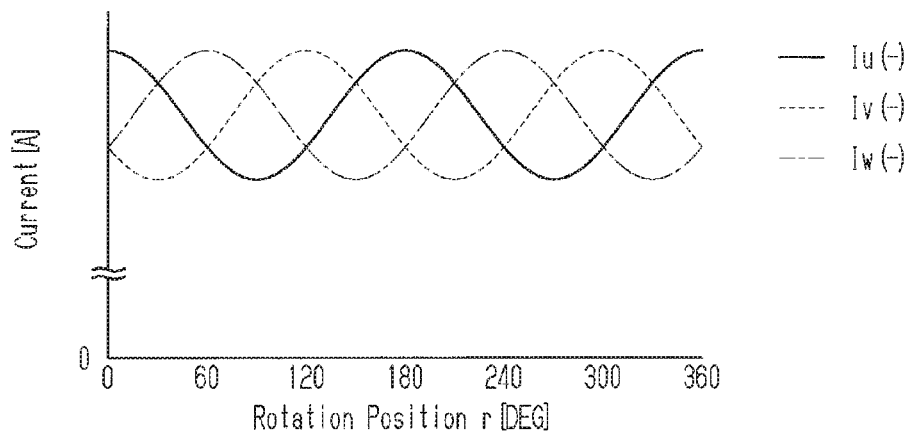
FIG. 13 is a graph showing subtraction values.
Figure 14:
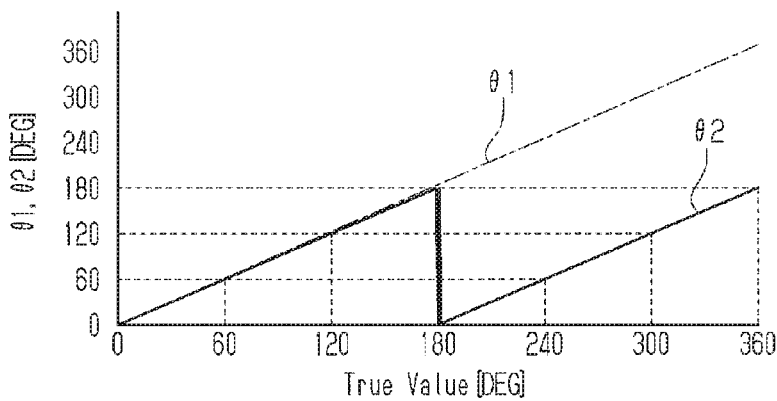
FIG. 14 is a graph showing the calculation result of the first initial angle and a second initial angle.

As shown in FIG. 13, each of the subtraction values Iu(−) to Iw(−) substantially has a sine waveform relative to the rotation position r. The phases of the subtraction values Iu(−) to Iw(−) are shifted from one another by 120 degrees.

Here, the Ipu(−) to Ipw(−), which are negative values, are subtracted from the Ipu(+) to Ipw(+), which are positive values. Thus, the absolute values of the subtraction values Iu(−) to Iw(−) are greater than the absolute values of the corresponding addition values Iu(+) to Iw(+). However, the subtraction cancels the current variations that result from the magnetic saturation characteristics. Thus, the subtraction values Iu(−) to Iw(−) do not have angle dependency that would be caused by the magnetic saturation characteristics. The subtraction values Iu(−) to Iw(−) may also be referred to as values obtained from adding the absolute values of the Ipu(+) to Ipw(+) and the absolute values of the Ipu(−) to Ipw(−), respectively.

The waveforms of the subtraction values Iu(−) to Iw(−) are substantially sinusoidal and shifted from one another by 120 degrees relative to the rotation position r. Thus, the controller 55 executes the process for deriving the second initial angle θ2 from the subtraction values Iu(−) to Iw(−).

More specifically, as shown in FIG. 9, in step S205, the controller 55 executes a three-phase to two-phase conversion process that converts the subtraction values Iu(−) to Iw(−) from three phases to two phases. More specifically, the controller 55 uses the subtraction values Iu(−) to Iw(−) to calculate the first conversion value α (α=√(⅔)×(Iu(−)−Iv(−)/2−Iw(−)/2)). The controller 55 also uses the subtraction values Iu(−) to Iw(−) to calculate the second conversion value β (β=√(⅔)×(√3/2×Iv(−)−√3/2×Iw(−))). The controller 55 that executes the process of step S205 corresponds to a "subtraction conversion unit."

In step S206, the controller 55 calculates a subtraction phase angle θ0(−), which is a phase of a vector corresponding to the conversion values α, β obtained through the three-phase to two-phase conversion process in step S205 (θ0(−)=arctan(α/β)). The subtraction phase angle θ0(−) is a value from −n to n.

Here, in the peak values Ipu(+) to Ipw(−), the negative value is subtracted from the positive value in the same phase. Thus, the subtraction phase angle θ0(−) is a parameter that includes a range of two cycles and corresponds to the inverse rotation. Thus, in step S207, the controller 55 multiplies the subtraction phase angle θ0(−) and −½. The value obtained by multiplying subtraction phase angle θ0(−) and −½ is referred to as θz.

In step S208, the controller 55 converts θz to the second initial angle θ2 having a value in a range of 0 to n. More specifically, when θz has a negative value, the controller 55 sets the second initial angle θ2 to a value obtained by adding n to θz. When θz has a positive value, the controller 55 sets the second initial angle θ2 to θz without any change.

The calculated second initial angle θ2 will now be described. As indicated by the solid line shown in FIG. 14, the second initial angle θ2 linearly increases when the true value of the initial position θt is 0 toward 180 degrees and becomes zero when the true value of the initial position θt is proximate to 180 degrees. The second initial angle θ2 linearly increases again when the true value of the initial position μt is 180 toward 360 degrees. Thus, two initial positions μt correspond to one second initial angle θ2. For example, the second initial angle θ2 corresponding to the initial position θt at 120 degrees is the same as the second initial angle θ2 corresponding to the initial position θt at 300 degrees.

In step S209, the controller 55 calculates the initial position θt using the first initial angle θ1 and the second initial angle θ2 and then ends the initial position derivation process, that is, the initial position obtaining process. More specifically, the controller 55 subtracts the second initial angle θ2 from the first initial angle θ1. When the subtracted value is π/2 to 3π/2 or less than −π/2, the controller 55 sets the initial position θt to a value obtained by adding π to the second initial angle θ2. Otherwise, the controller 55 sets the initial position θt to the second initial angle θ2 without any change. The controller 55 that executes the process of step S203 and step S206 to step S209 corresponds to a "derivation unit."

When the initial position θt is derived through the initial position obtaining process, the controller 55 activates the in-vehicle three-phase motor 13 by applying voltage of the pattern corresponding to the derived initial position θt so that the rotor 22 generates torque.

The operation of the present embodiment will now be described.

Figure 15:
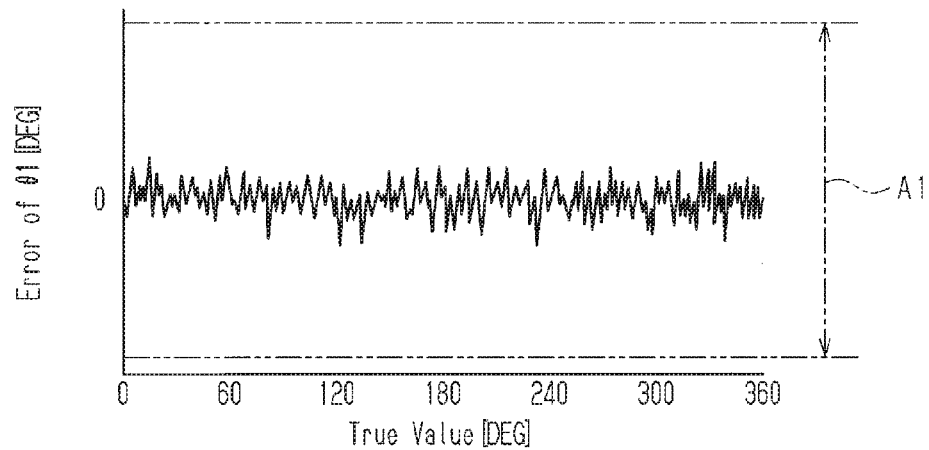
FIG. 15 is a graph showing errors of an initial position.

The initial position θt is unambiguously derived from the two initial angles θ1, θ2. In this case, the absolute values of the subtraction values Iu(−) to Iw(−) are greater than the absolute values of the corresponding addition values Iu(+) to Iw(+). This decreases the errors of the second initial angle θ2, which is derived from the subtraction values Iu(−) to Iw(−). Thus, as shown in FIG. 15, the initial position θt derived from the second initial angle θ2 has smaller errors than the first initial angel θ1. More specifically, the initial position θt derived from the second initial angle θ2 has an error range that is smaller than the error range A1 of the first initial angle θ1.

The present embodiment has the advantages described below.

(1) The controller 55 is configured to control the inverter 31 that drives the in-vehicle three-phase motor 13 having the rotor 22 incorporating the permanent magnets 22a and the phase coils 25u to 25w. The controller 55 executes the process for applying the voltage having the predetermined pulse width δT to each of the phase coils 25u to 25w in the positive direction and the negative direction. The controller 55 executes the process for obtaining the Ipu(+) to Ipw(−) of currents that flow resulting from the above voltage application and the process for calculating the addition values Iu(+) to Iw(+) obtained by adding the Ipu(+) to Ipw(+) and the Ipu(−) to Ipw(−). The controller 55 executes the three-phase to two-phase conversion process that converts the three addition values Iu(+) to Iw(+) from three phases to two phases, and the process for deriving the initial position θt, which is the magnetic pole position of the stopped rotor 22, based on the conversion result of the three-phase to two-phase conversion process. Thus, the accurate initial position θt is obtained.

More specifically, the inventors of the present application focus on the waveforms of the addition values Iu(+) to Iw(+) that have phases shifted from one another by 120 degrees relative to the rotation position r. The inventors have found that, instead of a range, a specific numerical value (angle) of the initial position θt (first initial angle θ1) can be derived by performing the three-phase to two-phase conversion process on the addition values Iu(+) to Iw(+). This improves the accuracy for deriving the initial position θt compared to a configuration for deriving a range in which the initial position θt exists.

(2) The pulse width δT needs to be set long enough to magnetically saturate the phase coils 25u to 25w. However, the long pulse width δT causes the rotor 22 to rotate. In this regard, for example, the pulse width δT may be set to a fixed value at which the magnetic saturation is formed and the rotor 22 does not rotate. However, the inductances Lu to Lw of the phase coils 25u to 25w vary in accordance with the parameters such as the rotation position r of the rotor 22 and the temperature of the phase coils 25u to 25w. This complicates the setting of the pulse width δT to the fixed value.

In this regard, the controller 55 of the present embodiment performs the test voltage application, which applies the voltage of the test pulse width δT1 to each of the phase coils 25u to 25w in the positive direction and the negative direction. Then, the controller 55 executes the process for calculating the main pulse width δT2, which is greater than the test pulse width δT1, based on the peak values Ipu(+) to Ipw(−) obtained through the test voltage application. After performing the test voltage application, the controller 55 again performs the main voltage application, which applies the voltage of the main pulse width δT2 to each of the phase coils 25u to 25w in the positive direction and the negative direction.

In this configuration, before the main voltage application is performed using the main pulse width δT2, the test voltage application is performed using the test pulse width δT1, which is narrower than the main pulse width δT2. This allows for obtaining of the present state of the phase coils 25u to 25w while inhibiting rotation of the rotor 22. The main pulse width δT2 is calculated based on the peak values Ipu(+) to Ipw(−) obtained through the test voltage application. Thus, the main voltage application is performed to form the magnetic saturation without rotating the rotor 22. This derives the accurate initial position θt while inhibiting rotation of the rotor 22.

(3) The controller 55, which includes the voltage sensor 53 detecting the input voltage Vd of the inverter 31, calculates the test pulse width δT1 based on the input voltage Vd1 detected by the voltage sensor 53. The controller 55 also calculates the main pulse width δT2 based on the input voltage Vd2 and the peak values Ipu(+) to Ipw(−) obtained through the test voltage application. This allows for variations in the input voltage Vd to be coped with in a suitable manner.

More specifically, the DC power source E mounted on the vehicle is a power storage device. The input voltage Vd easily varies because of characteristics of the power storage device. Such variations in the input voltage Vd may cause erroneous rotation of the rotor 22 when voltage is applied or a failure to form the magnetic saturation during the main voltage application. In this regard, in the present embodiment, the test pulse width δT1 and the main pulse width δT2 are set in accordance with the input voltage Vd. This limits the above disadvantages.

(4) The test pulse width δT1 is set in accordance with the input voltage Vd1 so that the test voltage application does not cause the rotor 22 to rotate. The main pulse width δT2 is set in accordance with the input voltage Vd2 and the peak values Ipu(+) to Ipw(−) obtained through the test voltage application in a range in which the main voltage application does not cause the rotor 22 to rotate and so that the phase coils 25u to 25w are magnetically saturated.

More specifically, the maximum value of the phase currents Iu to Iw that allows for the magnetic saturation of the phase coils 25u to 25w but does not allow for rotation of the rotor 22 is defined as the maximum allowance current Im. In this configuration, the test pulse width δT1 is set in accordance with the input voltage Vd1 so that the maximum value of the absolute values of the peak values Ipu(+) to Ipw(−), which are obtained through the test voltage application, does not exceed the maximum allowance current Im regardless of assumed variations in the inductances Lu to Lw of the phase coils 25u to 25w.

Additionally, one of the peak values Ipu(+) to Ipw(−) obtained through the test voltage application and having the greatest absolute value is defined as the maximum test peak value Itpm. The main pulse width δT2 is set in accordance with the absolute value of the maximum test peak value Itpm and the input voltage Vd2 so that when performing the main voltage application, the maximum value of the absolute values of the six peak values Ipu(+) to Ipw(−) becomes proximate to the maximum allowance current Im within a range that does not exceed the maximum allowance current Im and preferably conforms to the maximum allowance current Im. Thus, the main pulse width δT2 is set in correspondence with the present state of the phase coils 25u to 25w and the input voltage Vd2. This allows for the magnetic saturation without rotating the rotor 22.

(5) When performing the main voltage application after performing the test voltage application, the controller 55 re-obtains the input voltage Vd2 and calculates the main pulse width δT2 in accordance with the obtained result. Thus, even when the input voltage Vd for the main voltage application changes from the input voltage for the test voltage application, the changes in the input voltage Vd may be followed in a suitable manner.

(6) In the test voltage application and the main voltage application, the controller 55 obtains the six peak values Ipu(+) to Ipw(−) by applying the voltages of the six patterns 1 to 6. In this case, whenever changing the pattern, the controller 55 re-obtains the input voltage Vd and updates the pulse widths δT1, δT2 in accordance with the obtained result. Thus, changes in the input voltage Vd may be followed in a further suitable manner.

(7) The controller 55 executes the process for calculating the subtraction values Iu(−) to Iw(−) obtained by subtracting the Ipu(−) to Ipw(−) from the Ipu(+) to Ipw(+), which are obtained through the main voltage application, and executes the three-phase to two-phase conversion process that converts the three subtraction values Iu(−) to Iw(−) from three phases to two phases. The controller 55 derives the initial position θt based on the first initial angle θ1, which is derived from the addition values Iu(+) to Iw(+), and the second initial angle θ2, which is derived from the subtraction values Iu(−) to Iw(−). This improves the accuracy for deriving the initial position θt.

More specifically, the inventors focus on the waveforms of the subtraction values Iu(−) to Iw(−) that have phases shifted from one another by 120 degrees relative to the rotation position r. The inventors have found that the second initial angle θ2, which is a specific numerical value, is derived by performing the three-phase to two-phase conversion process on the subtraction values Iu(−) to Iw(−). In this case, the Ipu(−) to Ipw(−), which are negative values, are subtracted from the Ipu(+) to Ipw(+), which are positive values. Thus, the absolute values of the subtraction values Iu(−) to Iw(−) are greater than the absolute values of the corresponding the addition values Iu(+) to Iw(+). This tends to decrease the errors of the second initial angle θ2, which is derived from the subtraction values Iu(−) to Iw(−). However, the subtraction cancels current variations that result from the magnetic saturation characteristics. Thus, two initial positions θt differing from each other by 180 degrees correspond to one second initial angle θ2, and the true value cannot be specified.

In this regard, the addition values Iu(+) to Iw(+) are parameters that are angle-dependent because of the magnetic saturation characteristics. Thus, the first initial angle θ1, which is derived from the addition values Iu(+) to Iw(+), and the initial position θt are in one-to-one correspondence. Additionally, the absolute values of the addition values Iu(+) to Iw(+) are less than the absolute values of the corresponding subtraction values Iu(−) to Iw(−). This tends to increase the errors of the first initial angle θ1. However, the errors are sufficiently smaller than 180 degrees, which are the error between the two initial positions θt corresponding to the one second initial angle θ2. Thus, the first initial angle θ1 may be used to specify which one of the two initial positions θt corresponding to the one second initial angle θ2 is the true value. This allows for derivation of the initial position θt having small errors compared to a configuration in which only the first initial angle θ1 is used.

(8) The in-vehicle motor-driven compressor 10 includes the in-vehicle three-phase motor 13, the compression portion 12, which is driven by the in-vehicle three-phase motor 13 to compress refrigerant, serving as a fluid, and the controller 55. Thus, the obtaining of the accurate initial position θt allows for sufficient torque application at an initial stage when activating the in-vehicle three-phase motor 13. This achieves prompt activation of the in-vehicle motor-driven compressor 10. When the in-vehicle motor-driven compressor 10 is applied to the vehicle air conditioner 100, the vehicle air conditioner 100 is promptly activated and comfort may be improved.

It should be apparent to those skilled in the art that the present invention may be embodied in many other specific forms without departing from the scope of the invention. Particularly, it should be understood that the present invention may be embodied in the following forms.

The six patterns 1 to 6 of the voltage application are not limited to those illustrated in FIGS. 7, 8. For example, two power switching elements may be switched ON so that current flows to only two phases. In this case, the phase of the current flowing to the phase coils 25u to 25w is shifted by π/6. Thus, the initial position θt is a value obtained by subtracting π/6 from the initial angle θ1 (or initial angle θ2) obtained through the above control.

The controller 55 may set the initial position θt to the first initial angle θ1 and omit the process of step S204 to step S209. However, it is preferred from the viewpoint of accuracy that the initial position θt be configured to be derived from the first initial angle θ1 and the second initial angle θ2.

In the test voltage application, the phase coils 25u to 25w may or may not be magnetically saturated. The test voltage application only needs to be configured to obtain the maximum test peak value Itpm within a range in which the rotor 22 does not rotate.

The test pulse width δT1 may be a fixed value that does not change in accordance with the input voltage Vd1. In this case, the main pulse width δT2 may be a variable value or a fixed value, which does not change in accordance with the input voltage Vd2. However, a variable value is preferable for following variations in the input voltage Vd and the variations in the inductances Lu to Lw of the phase coils 25u to 25w.

The pulse width coefficient k may be the ratio of the maximum allowance current Im to the absolute value of the maximum test peak value Itpm (k=Im/|Itpm|). In this case, the main pulse width δT2 may be a value obtained by multiplying the pulse width coefficient k and the test pulse width δT1 obtained for the sixth time (δT2=k×δT1). In this configuration, the process of step S112 may be omitted.

The test voltage application may be omitted.

The current sensors 61 to 63 may be attached to any location as long as the phase currents Iu to Iw can be detected.

The subject where the in-vehicle motor-driven compressor 10 is installed in is not limited to a vehicle. The in-vehicle motor-driven compressor 10 may be installed in any subject.

The in-vehicle motor-driven compressor 10 is applied to the vehicle air conditioner 100. Instead, the in-vehicle motor-driven compressor 10 may be applied to any other devices. For example, when the vehicle is a fuel cell vehicle (FCV) including a fuel cell, the in-vehicle motor-driven compressor 10 may be applied to a supply device that supplies air to the fuel cell. The in-vehicle motor-driven compressor 10 may compress any fluid, which may be refrigerant or air.

Therefore, the present examples and embodiments are to be considered as illustrative and not restrictive, and the invention is not to be limited to the details given herein, but may be modified within the scope and equivalence of the appended claims.

The invention claimed is:

1. A controller configured to control an inverter that drives an in-vehicle three-phase motor, wherein the in-vehicle three-phase motor includes a u-phase coil, a v-phase coil, a w-phase coil, and a rotor incorporating a permanent magnet, the controller comprising:
    a voltage application unit configured to apply a voltage having a predetermined pulse width to each of the phase coils in a positive direction and a negative direction;
    a current obtaining unit configured to obtain a u-phase current in the positive direction, a u-phase current in the negative direction, a v-phase current in the positive direction, a v-phase current in the negative direction, a w-phase current in the positive direction, and a w-phase current in the negative direction that flow when the voltage application unit applies a voltage;
    an addition unit configured to calculate a u-phase addition value by adding the u-phase current in the positive direction and the u-phase current in the negative direction, a v-phase addition value by adding the v-phase current in the positive direction and the v-phase current in the negative direction, and a w-phase addition value by adding the w-phase current in the positive direction and the w-phase current in the negative direction;
    an addition conversion unit configured to perform a three-phase to two-phase conversion on the three addition values, which are the calculation results of the addition unit; and
    a derivation unit configured to derive a magnetic pole position of the rotor, when the rotor is stopped, based on the conversion result of the addition conversion unit.

2. The controller according to claim 1, wherein
    the voltage application unit is configured to perform a first voltage application and a second voltage application, the first voltage application is configured to apply a voltage having a first pulse width to each of the phase coils in the positive direction and the negative direction, and the second voltage application is configured to apply a voltage having a second pulse width, which is greater than the first pulse width, to each of the phase coils in the positive direction and the negative direction after the first voltage application is performed, the controller further comprising:

a pulse width calculation unit configured to calculate the second pulse width based on the obtained result of the current obtaining unit when the first voltage application is performed.

3. The controller according to claim 2 further comprising:

an input voltage detection unit configured to detect an input voltage of the inverter, wherein the pulse width calculation unit is configured to calculate the first pulse width based on the input voltage, and the pulse width calculation unit is also configured to calculate the second pulse width based on the input voltage and the obtained result of the current obtaining unit when the first voltage application is performed.

4. The controller according to claim 1 further comprising:

a subtraction unit configured to calculate a u-phase subtraction value by subtracting the u-phase current in the negative direction from the u-phase current in the positive direction, a v-phase subtraction value by subtracting the v-phase current in the negative direction from the v-phase current in the positive direction, and a w-phase subtraction value by subtracting the w-phase current in the negative direction from the w-phase current in the positive direction; and a subtraction conversion unit configured to perform the three-phase to two-phase conversion on the three subtraction values, which are the calculation results of the subtraction unit, wherein the derivation unit is configured to derive the magnetic pole position of the stopped rotor using a first initial angle derived from the conversion result of the addition conversion unit and a second initial angle derived from a conversion result of the subtraction conversion unit.

5. The controller according to claim 3, wherein the first pulse width is set in accordance with the input voltage so that the first voltage application does not rotate the rotor, and the second pulse width is set in accordance with the input voltage and the obtained result of the current obtaining unit when the first voltage application is performed in a range in which the second voltage application does not rotate the rotor to magnetically saturate each of the phase coils.

6. An in-vehicle motor-driven compressor comprising:

an in-vehicle three-phase motor, which includes a u-phase coil, a v-phase coil, a w-phase coil, and a rotor incorporating a permanent magnet;

a compression portion that compresses a fluid and is driven by the in-vehicle three-phase motor;

an inverter that drives the in-vehicle three-phase motor; and a controller configured to control the inverter, wherein the controller includes a voltage application unit configured to apply a voltage having a predetermined pulse width to each of the phase coils in a positive direction and a negative direction, a current obtaining unit configured to obtain a u-phase current in the positive direction, a u-phase current in the negative direction, a v-phase current in the positive direction, a v-phase current in the negative direction, a w-phase current in the positive direction, and a w-phase current in the negative direction that flow when the voltage application unit applies a voltage, an addition unit configured to calculate a u-phase addition value by adding the u-phase current in the positive direction and the u-phase current in the negative direction, a v-phase addition value by adding the v-phase current in the positive direction and the v-phase current in the negative direction, and a w-phase addition value by adding the w-phase current in the positive direction and the w-phase current in the negative direction, an addition conversion unit configured to perform a three-phase to two-phase conversion on the three addition values, which are the calculation results of the addition unit, and a derivation unit configured to derive a magnetic pole position of the rotor, when the rotor is stopped, based on the conversion result of the addition conversion unit.

* * * * *